(12) United States Patent
Montz et al.

(10) Patent No.: US 7,130,615 B2
(45) Date of Patent: Oct. 31, 2006

(54) SOFTWARE AUTHENTICATION FOR MOBILE COMMUNICATION DEVICES

(75) Inventors: Mark Andrew Montz, Elkhorn, NE (US); Rob Wayne Heldenbrand, Omaha, NE (US); Hans Anders Askerup, Omaha, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 357 days.

(21) Appl. No.: 10/660,424

(22) Filed: Sep. 10, 2003

(65) Prior Publication Data

US 2005/0054328 A1  Mar. 10, 2005

(51) Int. Cl.
H04M 1/66 (2006.01)
H04M 1/68 (2006.01)
H04M 3/16 (2006.01)
H04L 9/00 (2006.01)
G06F 11/38 (2006.01)

(52) U.S. Cl. ............... 455/411; 713/160; 713/189

(58) Field of Classification Search ............ 713/160, 713/189; 455/411
See application file for complete search history.

(56) References Cited

U.S. PATENT DOCUMENTS

| 2002/0144118 | A1 | 10/2002 | Maruyama |
| 2004/0049687 | A1* | 3/2004 | Orsini et al. ............ 713/189 |
| 2005/0054328 | A1* | 3/2005 | Montz et al. ............ 455/411 |
| 2005/0120208 | A1* | 6/2005 | Dobson et al. .......... 713/160 |

FOREIGN PATENT DOCUMENTS

| GB | 2360677 A | 9/2001 |
| WO | WO 00/070427 A1 | 11/2000 |
| WO | WO 03/019856 A2 | 3/2003 |

* cited by examiner

*Primary Examiner*—William D. Cumming

(57) ABSTRACT

A method for authenticating a mobile communication device (MCD) to a wireless network. The method includes transmitting from the wireless network to the MCD a first value. The method further includes receiving from the MCD at the wireless network a second value, the second value representing a function of the first value, a shared data value that is stored in both the MCD and the wireless network, and at least one metric pertaining to an application program stored in the MCD.

41 Claims, 5 Drawing Sheets

RESULT = RANDOM VALUE + SSD + SIZE 1 + SIZE 2 + SIZE 3 + SIZE N

CORRECT RESULT!
HLR/AC ALLOWS SERVICE!

RESULT = RANDOM VALUE + SSD + SIZE 1 + SIZE 2 + "HACKED SIZE 3" + SIZE N

INCORRECT RESULT!
HLR/AC DENIES SERVICE!

SOFTWARE AUTHENTICATION FOR MOBILE COMMUNICATION DEVICES

BACKGROUND OF THE INVENTION

Wireless communication systems, which includes cellular communication systems, have long been in existence. In a typical wireless communication system, a mobile handset employs the wireless network infrastructure to communicate voice and/or data with other telecommunication devices, such as another mobile handset, a land-based telephone, a computer, and the like. The wireless portion typically covers only the last hop between the wireless network infrastructure and the handset.

Generally speaking, the network infrastructure is built, maintained, and improved by one or more wireless service providers. These wireless service providers derive the bulk of their revenues from usage fees charged to the mobile handset subscribers (e.g., wireless phone users). The revenues may come in the form of a fixed monthly fee. More likely, there is, additionally or alternatively, a usage-based fee charged to the mobile handset subscriber based on the services employed (e.g., Internet access versus voice calls), the resources employed (e.g., faster versus slower access speed), and/or the duration of the communication session.

For customer satisfaction reasons and because these usage-based fees constitute a significant portion of the revenues received by wireless service providers, wireless service providers are motivated to ensure that the proper fee is charged to the subscriber for the service requested. If the charge is higher than what the subscriber expects to pay, customer satisfaction suffers. On the other hand, if a subscriber is able to employ a resource-intensive service (such as videoconferencing, for example) but is not charged accordingly, the wireless service provider loses revenue.

Most subscribers tend to be honest in honoring their contracts with their wireless service providers. For example, most subscribers expect that the charge incurred is proportional to the service utilized, and they would pay when billed. However, there are always some subscribers who, for a variety of reasons, attempt to avoid getting charged for services they actually use.

For example, a dishonest subscriber may manipulate his handset so that the handset would appear to the wireless network infrastructure as if that handset is associated with another subscriber's account. The dishonest subscriber is then able to use the network's services without getting personally charged for the services employed. The other innocent subscriber would then receive a surprisingly large invoice at the end of the billing period. Of course these unauthorized charges would be disputed by the innocent subscriber and in a large percentage of cases, the wireless service provider ends up writing off the invoice, receiving nothing for the use of their network infrastructure.

One way to combat the above-mentioned fraud is to use an authentication procedure to authenticate the handset before allowing the communication to take place. With reference to FIG. 1, in a typical GSM (Global System for Mobile Communication) network, an exemplary authentication scenario may involve the use of the Home Location Register/Authentication Center (HLR/AC) 102 to generate an "Authentication Request" using the Shared Secret Data (SSD). The Shared Secret Data (SSD) represents confidential and protected data shared by both the Authentication Center (AC) and the Subscriber Identity Module (SIM) in the handset. The Authentication Request contains a Random Value calculated based on the SSD. As part of the authentication procedure, the HLR/AC also generates a Result (HLR/AC Result) based on the SSD and the Random Value.

The Home Location Register/Authentication Center (HLR/AC) then forwards the Authentication Request (which includes the Random Value) and the HLR/AC Result to the Mobile Switching Center (MSC) 104. The MSC 104 in turn forwards the Authentication Request to the Base Station 106, which broadcasts the Authentication Request to the mobile handset 108. The HLR/AC Result itself is retained in the MSC 104. The mobile handset 108 then takes the Random Value from the Authentication Request and sends it to the Subscriber Identity Module (SIM) 110, which is within the mobile handset.

The SIM 110 then takes the received Random Value and generates its own Result (SIM Result) using its copy of the Shared Secret Data (SSD). The SIM Result is then sent back via the same path to the MSC 104. Note that the SSD never leaves either the HLR/AC 102 or the SIM 110.

The MSC then compares the HLR/AC Result with the SIM Result. If there is a match, then the handset is authenticated and communication can commence. On the other hand, if the HLR/AC Result and the SIM Result fail to match, authentication fails and service is denied.

Other authentication procedures also exist to ensure that the handset is positively identified and matched with the subscriber's account data before communication is authorized. Sophisticated authentication procedures are able to render it almost impossible for a dishonest user to attempt to fraudulent use another subscriber's account, thereby limiting the amount of loss revenue suffered by the wireless service provider.

As technology progresses, improvements and changes are made to the handsets to allow the handsets to handle an increasingly sophisticated array of communication services. Videoconferencing, internet browsing, database access, and interactive gaming are some examples of the services being contemplated. Furthermore, handsets are increasingly configured for expansion and/or update to accommodate new services and/or features. Accordingly, wherein older handsets tend to have their application programs stored in read-only memory (ROM) 112, newer handsets are increasingly storing the application programs in random access memory (RAM) for to facilitate re-programmability and/or updating.

As mobile handsets become more programmable, new opportunities exist for fraud. One of the more serious frauds practiced by dishonest subscribers involves reprogramming the software in the handset and duping the network into believing that the subscriber is employing a low-cost service (e.g., voice calls) while that subscriber is in fact employing a premium or higher cost service (e.g., videoconferencing). This is illustrated in FIG. 2 wherein application programs 202, 204, 206, and 208 are now stored in the RAM memory portion of handset 210 instead of in ROM. By hacking into application program 206 and reprogramming the program 206, a dishonest user can practice the aforementioned fraud on the wireless service provider.

A common way of hacking software 206 involves the unauthorized re-programming the software in the RAM of the mobile handset so that the software no longer correctly identifies to the network infrastructure the service it is actually using. For example, a portion of an application program for facilitating voice calls may be modified to execute videoconferencing code in a manner that does not trigger suspicion. Thus, while the high bandwidth interactive gaming service is used, the dishonest subscriber pays the lower rate associated with the low bandwidth voice calling service.

Note that the aforementioned prior art authentication procedure does nothing to prevent this type of fraud. In this case, the handset is correctly identified as belonging to the subscriber's account. The subscriber is actually paying for a service, albeit a service that is different from the service he is actually using, and in almost all cases, at a lower rate.

SUMMARY OF INVENTION

The invention relates, in one embodiment, to a method for authenticating a mobile communication device (MCD) to a wireless network. The method includes transmitting from the wireless network to the MCD a first value. The method further includes receiving from the MCD at the wireless network a second value, the second value representing a function of the first value, a shared data value that is stored in both the MCD and the wireless network, and at least one metric pertaining to an application program stored in the MCD.

In another embodiment, the invention relates to a method, in a mobile communication device (MCD), for authenticating the MCD to a wireless network. The method includes receiving from the wireless network at the MCD a first value. The method further includes transmitting from the MCD to the wireless network a second value. The second value represents a function of the first value, a shared data value that is stored in both the MCD and the wireless network, and at least one metric pertaining to at least one application program stored in the MCD.

In yet another embodiment, the invention relates to an article of manufacture comprising a program storage medium having computer readable code embodied therein, the computer readable code being configured to authenticate a mobile communication device (MCD) to a wireless network. There is included computer readable code for receiving from the wireless network at the MCD a first value. There is also included computer readable code for transmitting from the MCD to the wireless network a second value, the second value representing a function of the first value, a shared data value that is stored in both the MCD and the wireless network, and at least one metric pertaining to at least one application program stored in the MCD.

In still another embodiment, the invention relates to an article of manufacture comprising a program storage medium having computer readable code embodied therein, the computer readable code being configured to authenticate a mobile communication device (MCD) to a wireless network. There is included transmitting from the wireless network to the MCD a first value. There is further included receiving from the MCD at the wireless network a second value, the second value representing a function of the first value, a shared data value that is stored in both the MCD and the wireless network, and at least one metric pertaining to an application program stored in the MCD.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF PREFERRED EMBODIMENTS

Figure 1:
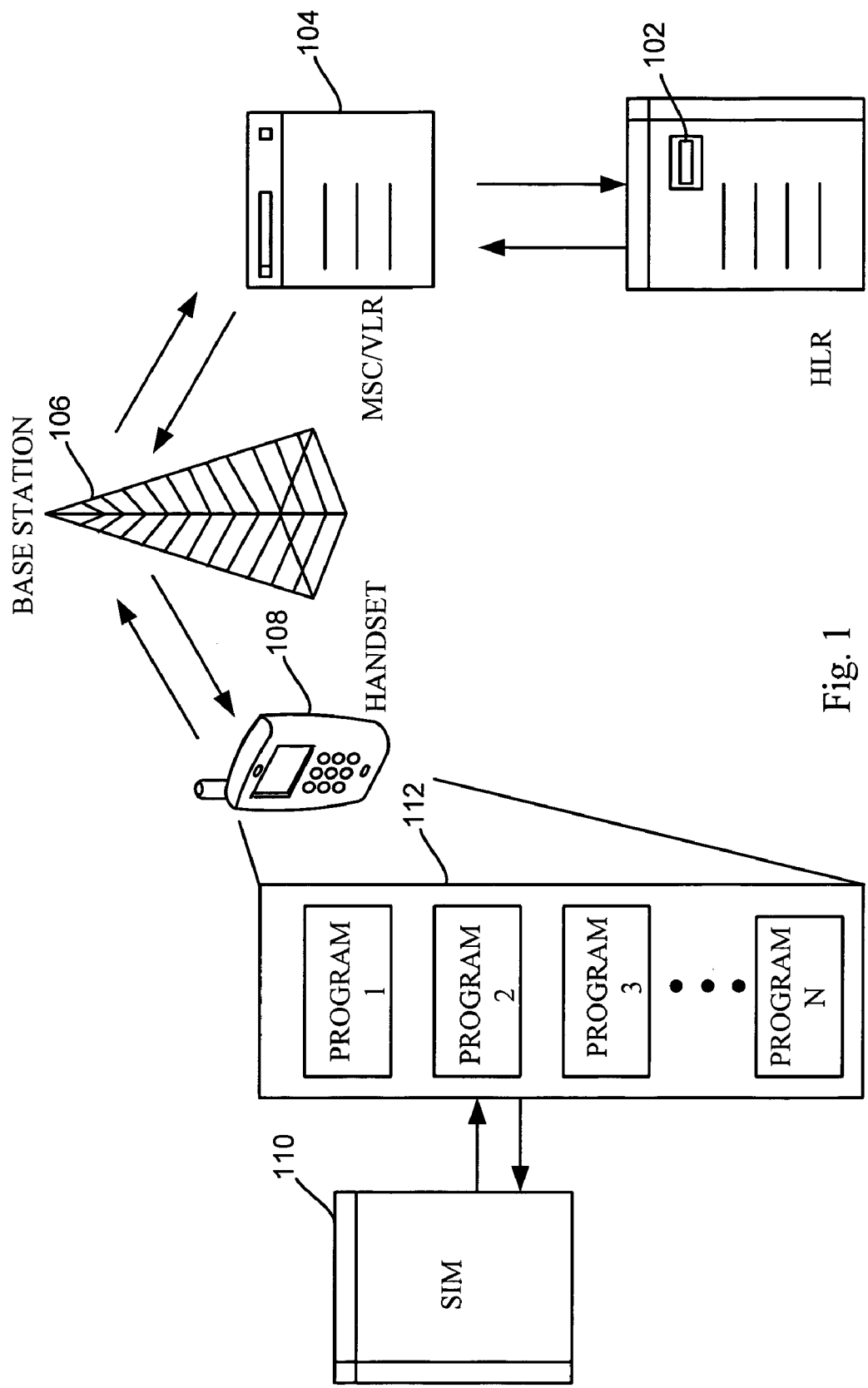
FIG. 1 illustrates an exemplary authentication scenario in a typical GSM (Global System for Mobile Communication) network.
Figure 2:
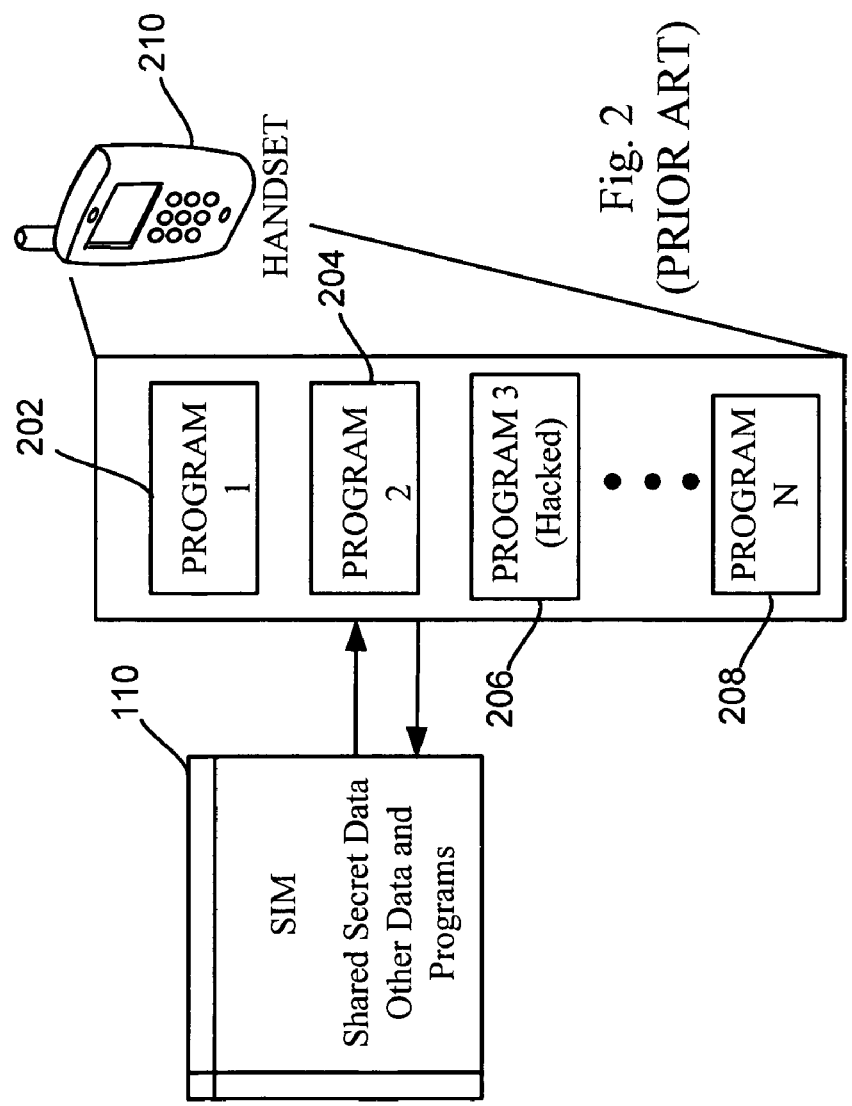
FIG. 2 illustrates an exemplary modern handset wherein programs are stored in RAM memory instead of ROM memory.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In one embodiment, the mobile communication device (MCD) is authenticated not only to ensure that the MCD matches with the subscriber's account but also to ensure that the software therein has not been tampered with. In one embodiment, the authentication algorithm employs at least one metric pertaining to the software in its authentication. If the software has been tampered with, the result of the authentication would differ from that expected by the wireless network, and service will be denied.

In one embodiment, the wireless network first obtains a Random Value. The wireless network then computes a Network Result from the Shared Secret Data, the Random Value, and the metric pertaining to the software within the MCD. The Shared Secret Data, as mentioned, represents the data shared by both the wireless network and the MCD. Furthermore, the metric pertaining to the software within the MCD is also shared by the wireless network and the MCD. The wireless network of course knows the true metric pertaining to the software based on the latest issuance of the software to the MCD.

The Random Value is then sent, typically wirelessly, to the MCD for authentication purposes. Using the Random Value, its own copy of the Shared Secret Data, and its own metric pertaining to the software stored in itself, the MCD then computes a MCD Result. The MCD Result is then returned to the wireless network, where it is compared against the Network Result. If the Network Result differs from the MCD Result, authentication fails.

The metric pertaining to the software may pertain to a single software program, i.e., the program responsible for the service the user is requesting. For example, if the user requests videoconferencing service, the metrics may pertain only to the videoconferencing software application. Alternatively or additionally, the metrics may pertain to a group of software applications stored within the MCD, or to all the software stored in the MCD. The metric may represent, for example, the size of the software. Alternatively, the metrics may pertain to any other measure that indicates that the software has been tampered and/or altered. For example, the metrics may represent a time/date stamp, a checksum number (e.g., additive checksum), a cyclic redundancy check (CRC) value, an offset value in a particular location, a version number, and/or any other unique identifying characteristics of the unaltered software. Preferably (but not necessarily), the software-related metrics is obtained from the software in response to an authentication request in prevent the dishonest user from storing a metric before software tampering and using that metric for authentication after the software has been hacked.

The MCD itself may represent any wireless device, including a mobile handset (also known as a cellular phone or a satellite phone). The MCD may also include a laptop having wireless communication capability, a personal digital assistant (PDA) or a portable gaming device that can communicate wirelessly with a network.

Figure 3:
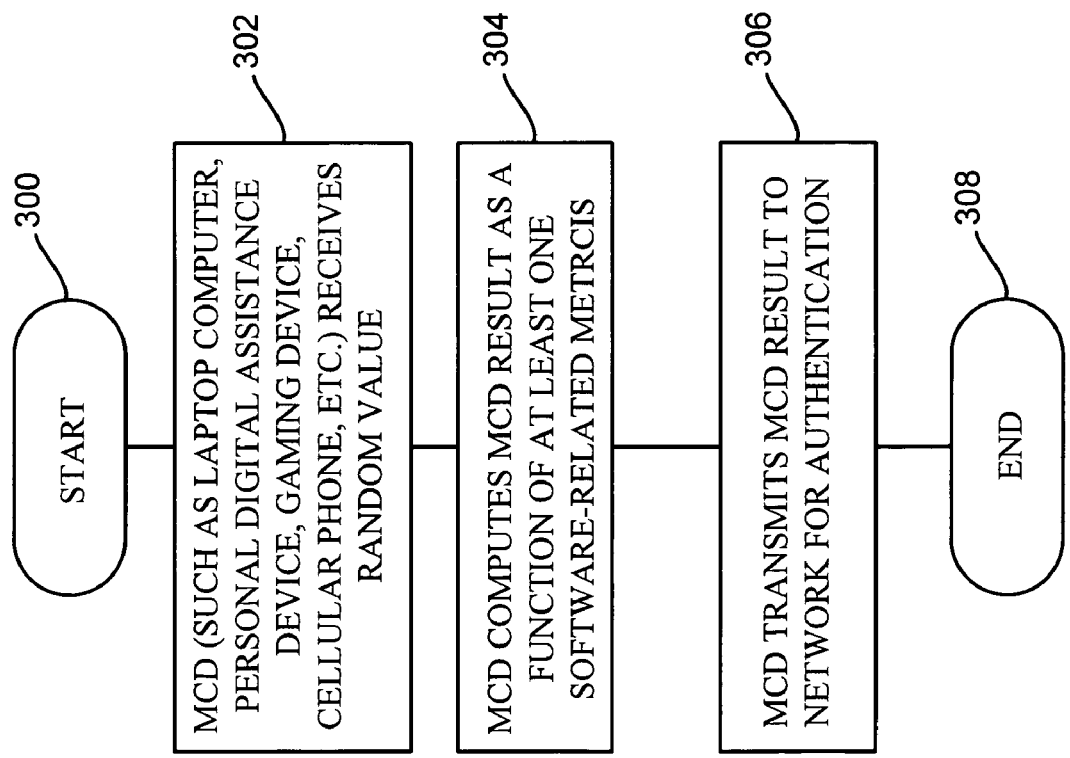
FIG. 3 shows, in accordance with one embodiment of the present invention, a flowchart illustrating the steps involved in authenticating a Mobile Communication Device (MCD) from the MCD's perspective.

The features and advantages of the present invention may be better understood with reference to the figures and discussions that follow. FIG. 3 shows, in accordance with one embodiment of the present invention, a flowchart illustrating the steps involved in authenticating a MCD from the MCD's perspective. In step 302, the Random Value is received by the MCD. In step 304, the MCD computes the MCD Result as a function of the Random Value, its own copy of the Secret Shared Data, and at least one metric pertaining to the application software. The function itself may be any mathematical function that is agreed upon before hand between the wireless network and the MCD.

In step 306, the MCD transmits the MCD Result back to the wireless network, where it will be compared against the Network Result calculated by the wireless network. As mentioned, the Network Result is also a function of the Random Value, the network's own copy of the Shared Secret Data, and the data value associated with to the agreed upon metrics pertaining to the application software in the MCD. If the MCD Result differs from the Network Results, authentication will be denied. Otherwise, authentication is satisfactory, and the service can begin.

Figure 4:
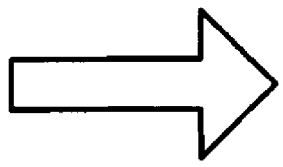
FIG. 4 illustrates, in accordance with one embodiment of the present invention which employs size as a program-related metric, a simplified authentication procedure that is successful.

FIG. 4 illustrates, in accordance with one embodiment of the present invention which employs size as a program-related metrics, a simplified authentication procedure that is successful.

Figure 5:
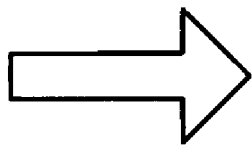
FIG. 5 illustrates, in accordance with one embodiment of the present invention which employs size as a program-related metrics, a simplified authentication procedure that fails due to the unauthorized tampering of the software within the MCD.

FIG. 5 illustrates, in accordance with one embodiment of the present invention which employs size as a program-related metrics, a simplified authentication procedure that fails due to the unauthorized tampering of the software within the MCD.

In accordance with one embodiment of the present invention, authentication may initiate upon MCD power-up, prior to any communication by the MCD, prior to approving any new service requested by the MCD user (such as switching from a voice call service to an interactive gaming service), or at random intervals as part of a surprise audit. The latter is particularly advantageous and is capable of defeating attempts at reprogramming the application software within the MCD after the initial authentication is successful.

In one embodiment, the wireless network is a GSM-based wireless network. In one implementation, the HLR/AC of the GSM network generates an authentication request, which contains both the Network Result and the Random Value to the Mobile Switching Center/Visitor Location Registry (MSC/VLR). Note that the Shared Secret Value does not leave the HLR/AC in this case. The MSC/VLR then retains the Network Result but passes on the Random Value in the Authentication Request to the MCD using the wireless medium. In this manner, the Network Result is not broadcasted over the wireless medium.

The MCD receives the Random Value and passes the Random Value to the Subscriber Identity Module (SIM). The SIM then calculates the MCD Result, and returns the MCD Result to the MCD transmitting circuitry, which sends the MCD Result back to the MSC of the GSM network. At the MSC, the MCD Result is compared against the Network Result for authentication purposes.

In one embodiment, since the function that computes the MCD result may be computationally intensive, the computation task may performed by the SIM, by software in ROM and/or RAM. By sharing some or all of the security computation with the ROM and/or RAM, authentication may be made substantially faster than can be performed by the SIM alone.

In one embodiment, different software-related metrics may be employed for authentication in different MCDs and/or at different times. The wireless network can communicate to the MCD which software-related metrics is being used for authentication via some covert means, such as in the Random Number, in the Authentication Request, in a different message. The metrics to be employed may also be ascertained by both the wireless network and the MCD based on other criteria, such as based on other data stored in the MCD, based on the time authentication is performed, etc. By using different software-related metrics in different MCDs and/or at different times in the authentication procedure, the authentication procedure is rendered even more tamper-resistant.

Although the example above is given with a GSM-based wireless network, it should be kept in mind that the authentication for application program integrity can be performed with any wireless network (including cellular-based and/or satellite-based). Furthermore, the invention is not limited to any particular metrics, to metrics for one or all the software in the MCD and/or the RAM portion of the MCD, and/or to any particular authentication algorithm as long as a metrics that reflect whether the application software has been tampered with is employed in the authentication process.

The invention provides many advantages. By including the software-related metrics in the authentication procedure, the wireless service provider can ensure that the software has not been tampered with, and can be reasonably confident that the service being provided is the same service for which the subscriber is charged. This is particularly important in the new generation of MCDs, which include software application programs stored in readily reprogrammable memory (e.g., RAM). Furthermore, such authentication procedure can be used to determine whether software in a subscriber's MCD has been updated, and if updating is needed, the subscriber can be contacted for updating the software or software updating can take place over the wireless medium.

Since the basic infrastructure of the wireless network does not need to be changed, the new authentication procedure can be phased in gradually, without requiring a substantial, traumatic change to the network. Subscribers who own legacy phones can still authenticate in the prior art manner since the wireless network (e.g., HLR/AC in the case of the GSM system) knows that the MCD to be authenticated does not have the authentication algorithm that takes into account the software metrics and will authenticate using only the Shared Secret Data as has been done in the current art. A subscriber who owns an MCD that includes the improved authentication algorithm will have his MCD authenticated using an algorithm that employs the software-related metrics.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for authenticating a mobile communication device (MCD) to a wireless network, comprising:
    transmitting from said wireless network to said MCD a first value; and
    receiving from said MCD at said wireless network a second value, said second value representing a function of said first value, a shared data value that is stored in both said MCD and said wireless network, and at least one metric pertaining to an application program stored in said MCD, wherein said first value is computed by a device associated with said wireless network using said shared data value and a third value, said third value equals said at least one metric pertaining to said application program.

2. The method of claim 1 wherein said application program represents software stored in reprogrammable memory of said MCD, said software being associated with a service requested by a user of said MCD.

3. The method of claim 2 wherein said at least one metric represents a size of said application program.

4. The method of claim 1 further comprising calculating, using said device associated with said wireless network, a fourth value using said shared data and said third value, said authenticating being deemed a failure if said second value differs from said fourth value.

5. The method of claim 4 wherein said shared data represents data stored in a manner so as to substantially protect said shared data from being accessible by said user, said shared data being configured never to be transmitted wirelessly from said MCD after said MCD is assigned to said user.

6. The method of claim 1 wherein said wireless network represents a GSM (Global System for Mobile Communication) network, said second value being received by a Mobile Switching Center (MSC) of said GSM network.

7. The method of claim 6 wherein said first value is computed by an Authentication Center of said GSM network.

8. The method of claim 1 wherein said at least one metric represents a size of said application program.

9. The method of claim 1 wherein said MCD is a wireless handset.

10. The method of claim 9 wherein said MCD is one of a laptop computer, a personal digital assistance (PDA), and a portable gaming device.

11. In a mobile communication device (MCD), a method for authenticating said MCD to a wireless network, comprising:
    receiving from said wireless network at said MCD a first value; and
    transmitting from said MCD to said wireless network a second value, said second value representing a function of said first value, a shared data value that is stored in both said MCD and said wireless network, and at least one metric pertaining to at least one application program stored in said MCD, wherein said first value is computed by a device associated with said wireless network using said shared data value and a third value, said third value equals said at least one metric.

12. The method of claim 11 wherein said at least one application program represents software stored in reprogrammable memory of said MCD, said software being associated with a service requested by a user of said MCD.

13. The method of claim 11 wherein said at least one metric reflects a size of said at least one application program.

14. The method of claim 11 further comprising calculating, using said device associated with said wireless network, a fourth value using said shared data and said third value, said authenticating being deemed a failure if said second value differs from said fourth value.

15. The method of claim 14 wherein said shared data represents data stored in a manner so as to substantially protect said shared data from being acquired by said user, said shared data being configured never to be transmitted wirelessly from said MCD after said MCD is assigned to said user.

16. The method of claim 11 wherein said wireless network represents a GSM (Global System for Mobile Communication) network, said second value being received by a Mobile Switching Center (MSC) of said GSM network.

17. The method of claim 16 wherein said first value is computed by an Authentication Center of said GSM network.

18. The method of claim 11 wherein said at least one metric represents a size of said application program.

19. The method of claim 11 wherein said MCD is a wireless handset.

20. The method of claim 19 wherein said MCD is one of a laptop computer, a personal digital assistance (PDA), and a portable gaming device.

21. An article of manufacture comprising a program storage medium having computer readable code embodied therein, said computer readable code being configured to authenticate a mobile communication device (MCD) to a wireless network, comprising:
    computer readable code for receiving from said wireless network at said MCD a first value; and
    computer readable code for transmitting from said MCD to said wireless network a second value, said second value representing a function of said first value, a shared data value that is stored in both said MCD and said wireless network, and at least one metric pertaining to at least one application program stored in said MCD, wherein said first value is computed by a device associated with said wireless network using said shared data value and a third value, said third value equals said at least one metric.

22. The article of manufacture of claim 21 wherein said at least one application program represents software stored in reprogrammable memory of said MCD, said software being associated with a service requested by a user of said MCD.

23. The article of manufacture of claim 22 wherein said at least one metric reflects a size of said at least one application program.

24. The article of manufacture of claim 21 further comprising computer readable code for calculating, using said device associated with said wireless network, a fourth value using said shared data and said third value, said authenticating being deemed a failure if said second value differs from said fourth value.

25. The article of manufacture of claim 24 wherein said shared data represents data stored in a manner so as to substantially protect said shared data from being acquired by said user, said shared data being configured never to be transmitted wirelessly from said MCD after said MCD is assigned to said user.

26. The article of manufacture of claim 21 wherein said wireless network represents a Global System for Mobile Communication (GSM) network, said second value being received by a Mobile Switching Center (MSC) of said GSM network.

27. The article of manufacture of claim 26 wherein said first value is computed by an Authentication Center of said GSM network.

28. The article of manufacture of claim 21 wherein said at least one metric represents a size of said application program.

29. The article of manufacture of claim 21 wherein said MCD is a wireless handset.

30. The article of manufacture of claim 29 wherein said MCD is one of a laptop computer, a personal digital assistance (PDA), and a portable gaming device.

31. An article of manufacture comprising a program storage medium having computer readable code embodied therein, said computer readable code being configured to authenticate a mobile communication device (MCD) to a wireless network, comprising:

transmitting from said wireless network to said MCD a first value; and receiving from said MCD at said wireless network a second value, said second value representing a function of said first value, a shared data value that is stored in both said MCD and said wireless network, and at least one metric pertaining to an application program stored in said MCD, wherein said first value is computed by a device associated with said wireless network using said shared data value and a third value, said third value equals said at least one metric pertaining to said application program.

32. The article of manufacture of claim 31 wherein said application program represents software stored in reprogrammable memory of said MCD, said software being associated with a service requested by a user of said MCD.

33. The article of manufacture of claim 32 wherein said at least one metric represents a size of said application program.

34. The article of manufacture of claim 31 further comprising calculating, using said device associated with said wireless network, a fourth value using said shared data and said third value, said authenticating being deemed a failure if said second value differs from said fourth value.

35. The article of manufacture of claim 34 wherein said shared data represents data stored in a manner so as to substantially protect said shared data from being accessible by said user, said shared data being configured never to be transmitted wirelessly from said MCD after said MCD is assigned to said user.

36. The article of manufacture of claim 31 wherein said wireless network represents a GSM (Global System for Mobile Communication) network, said second value being received by a Mobile Switching Center (MSC) of said GSM network.

37. The article of manufacture of claim 36 wherein said first value is computed by an Authentication Center of said GSM network.

38. The article of manufacture of claim 31 wherein said at least one metric represents a size of said application program.

39. The article of manufacture of claim 31 wherein said MCD is a wireless handset.

40. The article of manufacture of claim 39 wherein said MCD is one of a laptop computer, a personal digital assistance (PDA), and a portable gaming device.

41. The article of manufacture of claim 31 wherein said at least one metric reflects one of a time stamp and a checksum associated with said at least one application program.

* * * * *